United States Patent
Honda

(10) Patent No.: US 11,334,043 B2
(45) Date of Patent: May 17, 2022

(54) OPERATING TERMINAL AND FACILITY DEVICE CONTROL SYSTEM

(71) Applicant: Mitsubishi Electric Corporation, Tokyo (JP)

(72) Inventor: Takeshi Honda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/982,147

(22) PCT Filed: Jun. 11, 2018

(86) PCT No.: PCT/JP2018/022281
§ 371 (c)(1),
(2) Date: Sep. 18, 2020

(87) PCT Pub. No.: WO2019/239470
PCT Pub. Date: Dec. 19, 2019

(65) Prior Publication Data
US 2021/0072776 A1 Mar. 11, 2021

(51) Int. Cl.
*G05B 19/042* (2006.01)
*G05B 15/02* (2006.01)
(Continued)

(52) U.S. Cl.
CPC .......... *G05B 19/0421* (2013.01); *F24F 11/54* (2018.01); *F24F 11/56* (2018.01);
(Continued)

(58) Field of Classification Search
CPC .... G05B 15/02; G05B 19/00; G05B 19/0421; G05B 2219/163; G05B 2219/2642;
(Continued)

(56) References Cited

U.S. PATENT DOCUMENTS 5,010,459 A * 4/1991 Taylor ................... H05B 47/12
362/85
7,216,017 B2 5/2007 Kwon et al.
(Continued)

FOREIGN PATENT DOCUMENTS

JP  2000-333278 A  11/2000
JP     3108203 U   4/2005
(Continued)

OTHER PUBLICATIONS

Office Action dated Apr. 30, 2021, issued in corresponding JP Patent Application No. 2020-524971 (and English Machine Translation).
(Continued)

*Primary Examiner* — Crystal J Barnes-Bullock
(74) *Attorney, Agent, or Firm* — Posz Law Group, PLC

(57) ABSTRACT

An operating terminal includes: a connected-device information transmitting unit transmitting first connected-device information to another operating terminal, the first connected-device information being information on a facility device connected to the operating terminal; a connected-device information obtaining unit obtaining second connected-device information from the another operating terminal, the second connected-device information being information on a facility device connected to the another operating terminal; an operation receiving unit receiving an operation for being performed on a facility device connected to the operating terminal and a facility device connected to the another operating terminal; and an air conditioning control command transmitting unit determining, from the first connected-device information and the second connected-device information, a destination of a control command and transmitting the control command to the destination, the control command representing content of an operation received by the operation receiving unit.

9 Claims, 7 Drawing Sheets

(51) Int. Cl.
  *G05D 23/19* (2006.01)
  *F24F 11/54* (2018.01)
  *F24F 11/56* (2018.01)
(52) U.S. Cl.
  CPC ......... *G05B 15/02* (2013.01); *G05D 23/1917* (2013.01); *G05B 2219/163* (2013.01); *G05B 2219/2642* (2013.01)
(58) Field of Classification Search
  CPC .... G05D 23/1917; H04L 41/044; F24F 11/54; F24F 11/56
  See application file for complete search history.

(56) References Cited

U.S. PATENT DOCUMENTS

| | | | | |
|---|---|---|---|---|
| 8,484,329 B2* | 7/2013 | Sato | ............... | H04L 12/282 |
| | | | | 709/223 |
| 9,743,232 B2* | 8/2017 | Umetani | ............... | H04W 4/021 |
| 9,921,559 B2* | 3/2018 | Tsubota | ............... | G05B 19/00 |
| 2012/0004739 A1* | 1/2012 | Sato | ............... | H04L 12/282 |
| | | | | 700/7 |
| 2014/0156086 A1 | 6/2014 | Kuroiwa | | |

FOREIGN PATENT DOCUMENTS

| | | |
|---|---|---|
| JP | 4207646 B2 | 1/2009 |
| JP | 4546189 B2 | 9/2010 |
| WO | 2018/087930 A1 | 5/2018 |

OTHER PUBLICATIONS

Extended Search Report dated Apr. 23, 2021, issued in corresponding EP Patent Application No. 18922446.2.

International Search Report of the International Searching Authority dated Jul. 17, 2018 for the corresponding International application No. PCT/JP2018/022281 (and English translation).

* cited by examiner

FIG.3

| FACILITY DEVICE | CONNECTED OPERATING TERMINAL | |
|---|---|---|
| DEVICE 2a-1 | OPERATING TERMINAL 1a | ⎫ |
| DEVICE 2a-2 | OPERATING TERMINAL 1a | ⎬ FIRST CONNECTED-DEVICE INFORMATION |
| ⋮ | ⋮ | |
| DEVICE 2a-m | OPERATING TERMINAL 1a | ⎭ |
| DEVICE 2b-1 | OPERATING TERMINAL 1b | ⎫ |
| ⋮ | ⋮ | ⎬ SECOND CONNECTED-DEVICE INFORMATION |
| DEVICE 2b-n | OPERATING TERMINAL 1b | ⎭ |

| FACILITY DEVICE | COMMAND CONTENT |

OPERATING TERMINAL AND FACILITY DEVICE CONTROL SYSTEM

CROSS REFERENCE TO RELATED APPLICATION

This application is a U.S. national stage application of International Patent Application No. PCT/JP2018/022281 filed on Jun. 11, 2018, the disclosure of which is incorporated herein by reference.

TECHNICAL FIELD

The present invention relates to an operating terminal which operates a facility device installed in a building and a facility device control system.

BACKGROUND

As a facility device installed inside a building, an air-conditioning device, a lighting device, a ventilation device, and the like are exemplified. Pluralities of these facility devices are installed in the building. Each facility device in the building is connected to one operating terminal and operates in accordance with the content of an operation received by the operating terminal (see, for example, Patent Literature 1).

PATENT LITERATURE

Patent Literature 1: Japanese Utility Model Registration No. 3108203

Each facility device installed in a building is usually connected to an operating terminal via a cable and communicates with the operating terminal. In general, each facility device is connected with a crossover wire which is wiring with which addition of facility devices or the like is easily performed, and power supply and communication are performed through the crossover wire. The number of facility devices which can be connected depends on power supply capacity. Therefore, it may be difficult to connect all facility devices in the building to one operating terminal so that the one operating terminal can operate all the facility devices. In such a case, multiple operating terminals are installed, each facility device is connected to any one of the operating terminals, and each facility device operates in accordance with an operation received by the operating terminal connected to the facility device. Conventionally, a facility device which each operating terminal can operate is limited to a facility device connected to the operating terminal, so that when a user operates a facility device located far away, the user needs to move to an operating terminal connected to the facility device which the user wishes to operate.

SUMMARY

The present invention has been made in view of the above, and an object thereof is to obtain an operating terminal capable of increasing the number of operable facility devices.

In order to solve the above-described problem and achieve the object, the operating terminal according to the present invention includes an information transmitting unit transmitting first connected-device information to another operating terminal, the first connected-device information being information on a facility device connected to the operating terminal, and an information obtaining unit obtaining second connected-device information from the another operating terminal, the second connected-device information being information on a facility device connected to the another operating terminal. In addition, the operating terminal includes an operation receiving unit receiving an operation for being performed on a facility device connected to the operating terminal and a facility device connected to the another operating terminal, and a control command transmitting unit determining, from the first connected-device information and the second connected-device information, a destination of a control command and transmitting the control command to the destination, the control command representing content of an operation received by the operation receiving unit.

The operating terminal according to the present invention achieves an effect that the number of operable facility devices can be increased.

BRIEF DESCRIPTION OF DRAWINGS

FIG. 3 is a diagram illustrating an example of system configuration information.

DETAILED DESCRIPTION

Hereinafter, an operating terminal and a facility device control system according to an embodiment of the present invention will be described in detail with reference to the drawings. The present invention is not limited to the embodiment.

Embodiment

Figure 1:
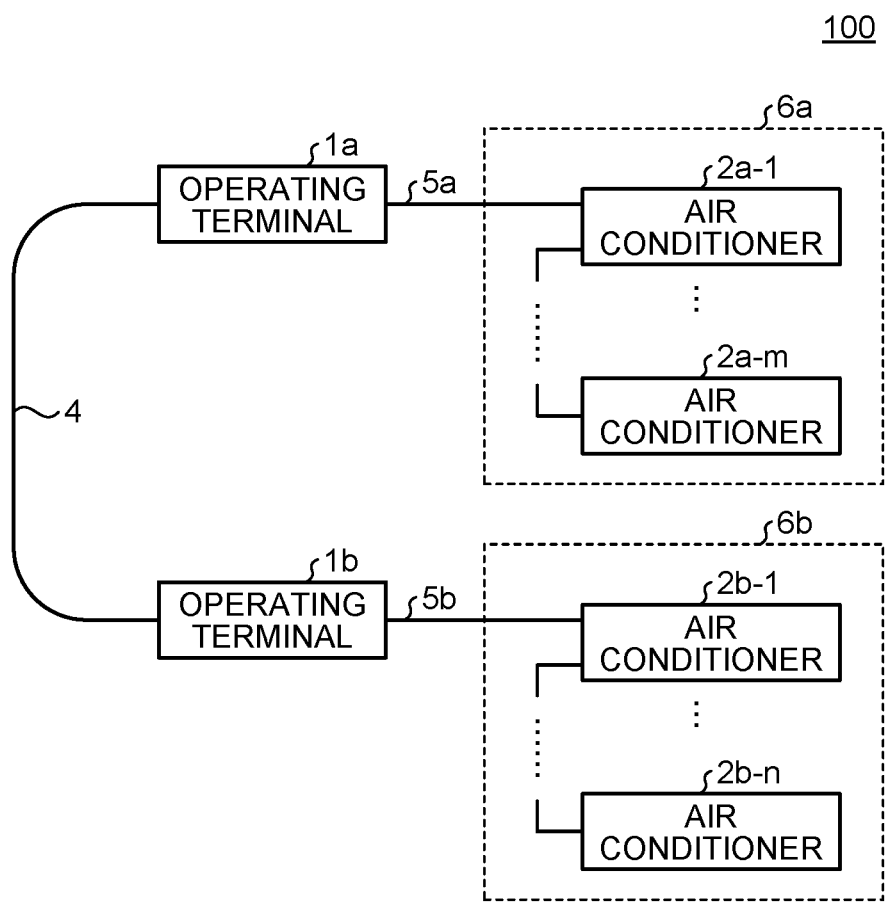
FIG. 1 is a diagram illustrating an example configuration of a facility device control system according to an embodiment of the present invention.

FIG. 1 is a diagram illustrating an example configuration of a facility device control system according to an embodiment of the present invention. A facility device control system 100 according to the present embodiment is configured to include multiple operating terminals 1a and 1b, air conditioners 2a-1 to 2a-m which are air conditioners connected to the operating terminal 1a, and air conditioners 2b-1 to 2b-n which are air conditioners connected to the operating terminal 1b. Hereinafter, when a description is given without distinguishing between the operating terminals 1a and 1b, the operating terminals 1a and 1b may be referred to as an operating terminal 1. In addition, when a description is given without distinguishing among the air conditioners 2a-1 to 2a-m, the air conditioners 2a-1 to 2a-m may be referred to as an air conditioner 2a. Similarly, when a description is given without distinguishing among the air conditioners 2b-1 to 2b-n, the air conditioners 2b-1 to 2b-n may be referred to as an air conditioner 2b. In addition, when a description is given without distinguishing the air conditioners 2a-1 to 2a-m and 2b-1 to 2b-n from each other, the air conditioners 2a-1 to 2a-m and 2b-1 to 2b-n may be referred to as an air-conditioner 2.

Although the example illustrated in FIG. 1 is an example of a case where the number of operating terminals 1 constituting the facility device control system 100 is two, the number of operating terminals 1 may be three or more. In addition, it is satisfactory as long as at least one air conditioner is connected to each of the multiple operating terminals 1. FIG. 1 illustrates an example of a case where the facility device which is operated using the operating terminal 1 is an air conditioner, but the facility device to be operated is not limited to the air conditioner. Other examples of the facility device to be operated include a lighting device and a ventilation device.

Each operating terminal 1 is installed on a floor where multiple air conditioners 2 are installed. For example, a floor on which the multiple air conditioners 2 are installed is divided into multiple areas, and one operating terminal 1 is installed in each area. At least one air conditioner 2 is installed in each area. The operating terminal 1 is a terminal for operating the air conditioners 2. The operating terminal 1a is connected to the air conditioners 2a-1 to 2a-m through a communication line 5a and can communicate with each of these air conditioners. The operating terminal 1b is connected to the air conditioners 2b-1 to 2b-n through a communication line 5b and can communicate with each of these air conditioners. The operating terminal 1a and the air conditioners 2a-1 to 2a-m are connected with a crossover wire. Similarly, the operating terminal 1b and the air conditioners 2b-1 to 2b-n are connected with a crossover wire. When a description is given without distinguishing between the communication lines 5a and 5b, these may be referred to as a communication line 5. The operating terminals 1a and 1b can communicate with each other through a communication line 4. The communication through the communication line 4 may be either wired communication or wireless communication. For example, Internet protocol or Bluetooth (registered trademark) protocol may be employed as a protocol used in the wireless communication. The air conditioners 2a-1 to 2a-m connected to the operating terminal 1a form an air conditioner group 6a, and the air conditioners 2b-1 to 2b-n connected to the operating terminal 1b form an air conditioner group 6b.

The operating terminal 1 stores information on each air conditioner 2 connected thereto and information on each air conditioner 2 connected to another operating terminal 1. For example, the operating terminal 1a stores information indicating that the air conditioners 2 connected thereto, that is, to the operating terminal 1a are the air conditioners 2a-1 to 2a-m, and stores information indicating that the air conditioners 2 connected to the operating terminal 1b are the air conditioners 2b-1 to 2b-n. When the operating terminal 1 receives an operation to be performed on the air conditioner 2 from the user, the operating terminal 1 generates an air conditioning control command indicating the content of the received operation and transmits the air conditioning control command to the air conditioner 2. At that time, the operating terminal 1 identifies the operating terminal 1 to which the air conditioner 2 as a target of the received operation is connected, and in a case where the air conditioner 2 to be operated is connected to the operating terminal 1, the operating terminal 1 outputs an air conditioning control command to the communication line 5 to which the air conditioner 2 is connected. In a case where the air conditioner 2 to be operated is connected to the another operating terminal 1, the operating terminal 1 outputs an air conditioning control command to the communication line 4 to which the another operating terminal 1 is connected. The air conditioning control command output to the communication line 4 is transmitted, via the operating terminal 1 to which the air conditioner 2 as the target of the received operation described above is connected, to the air conditioner 2. Operations received by the operating terminal 1 from the user include an operation of selecting at least one of the multiple air conditioners 2 and an operation of indicating an operation to be performed by the selected air conditioner 2.

In addition, when the operating terminal 1 receives an air conditioning control command generated by the another operating terminal 1, the operating terminal 1 checks the received air conditioning control command. Then, in a case where the operation indicated by the air conditioning control command is an operation to be performed on the air conditioner 2 connected to the operating terminal 1, the operating terminal 1 outputs the received air conditioning control command to the communication line 5 to which the air conditioner 2 is connected.

Figure 2:
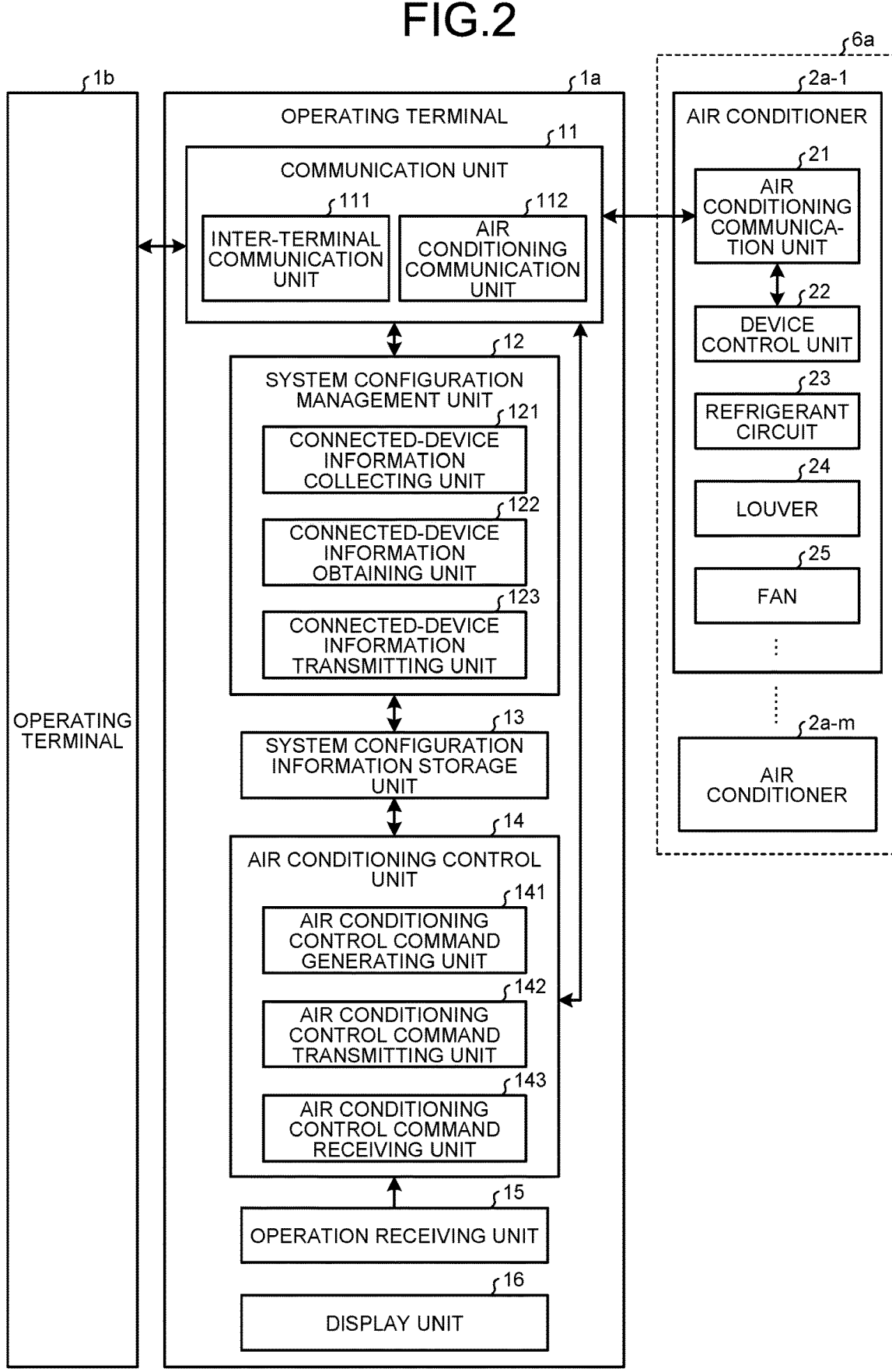
FIG. 2 is a diagram illustrating an example configuration of each of an operating terminal and an air conditioner according to the present embodiment.

FIG. 2 is a diagram illustrating an example configuration of each of the operating terminal and the air conditioner according to the present embodiment. Because the respective operating terminals 1 have the same configuration, FIG. 2 describes the example configuration of the operating terminal 1a and omits a description of the configuration of the operating terminal 1b. Similarly, because the respective air conditioners 2 have the same configuration, FIG. 2 describes the example configuration of the air conditioner 2a-1 and omits a description of the configuration of the air conditioner 2a-m. In addition, FIG. 2 omits a description of the air conditioners 2b connected to the operating terminal 1b. Because the respective operating terminals 1 perform operations similar to each other, the configuration and operation of the operating terminal 1a will be described below. In addition, because the respective air conditioners 2 perform operations similar to each other, the configuration and operation of the air conditioner 2a-1 will be described below.

The operating terminal 1a includes a communication unit 11, a system configuration management unit 12, a system configuration information storage unit 13, an air conditioning control unit 14, an operation receiving unit 15, and a display unit 16.

The communication unit 11 includes an inter-terminal communication unit 111 and an air conditioning communication unit 112. The inter-terminal communication unit 111 communicates with the operating terminal 1b through the communication line 4 illustrated in FIG. 1. In a case where there is an operating terminal other than the operating terminals 1a and 1b, the inter-terminal communication unit 111 also communicates with the operating terminal other than the operating terminal 1b. The air conditioning communication unit 112 communicates with the air conditioners 2a through the communication line 5a illustrated in FIG. 1.

The system configuration management unit 12 includes a connected-device information collecting unit 121, a connected-device information obtaining unit 122, and a connected-device information transmitting unit 123.

The connected-device information collecting unit 121 collects information on the air conditioners 2a connected to the operating terminal including the connected-device information collecting unit 121, that is, the operating terminal 1a. The information collected by the connected-device information collecting unit 121 is first connected-device information.

The connected-device information obtaining unit 122 obtains information on the air conditioners 2b connected to another operating terminal, that is, the operating terminal 1b, from the operating terminal 1b. The information obtained by the connected-device information obtaining unit 122 is second connected-device information. In a case where there is another operating terminal other than the operating terminal 1b, the connected-device information obtaining unit 122 also obtains information on the air conditioners 2 connected to the another operating terminal other than the operating terminal 1b. The connected-device information obtaining unit 122 is an information obtaining unit which obtains second connected-device information, which is information on facility devices connected to another operating terminal.

The connected-device information transmitting unit 123 transmits the first connected-device information, which is the information collected by the connected-device information collecting unit 121, to the operating terminal 1b. In a case where there is another operating terminal other than the operating terminal 1b, the connected-device information transmitting unit 123 transmits the first connected-device information also to the another operating terminal other than the operating terminal 1b. The first connected-device information transmitted by the connected-device information transmitting unit 123 of the operating terminal 1a is information indicating the air conditioners 2a-1 to 2a-m connected to the operating terminal 1a. The connected-device information transmitting unit 123 is an information transmitting unit which transmits the first connected-device information to another operating terminal. The first connected-device information transmitted by the operating terminal 1a includes, for example, identification information regarding the operating terminal 1a and identification information regarding each of the air conditioners 2a-1 to 2a-m. The first connected-device information transmitted by the operating terminal 1a may include, in addition to the identification information regarding the operating terminal 1a and the identification information regarding each of the air conditioners 2a-1 to 2a-m, model information indicating the model of each of the air conditioners 2a-1 to 2a-m. In a case where the connected-device information includes the model information, the operating terminal 1b which has received the first connected-device information can know a function of each of the air conditioners 2a connected to the operating terminal 1a.

The system configuration information storage unit 13 stores system configuration information indicating a configuration of the facility device control system 100. The system configuration information is information indicating which air conditioner 2 is connected to which of the multiple operating terminals 1 constituting the facility device control system 100. Specifically, the system configuration information is information including the first connected-device information which is the information collected by the connected-device information collecting unit 121 and the second connected-device information which is the information obtained by the connected-device information obtaining unit 122. FIG. 3 is a diagram illustrating an example of the system configuration information, and illustrates an example of the system configuration information stored in the system configuration information storage unit 13 of the operating terminal 1a. As illustrated in FIG. 3, the system configuration information is configured to include, for example, information on respective facility devices constituting the facility device control system 100 and information on operating terminals to which the respective facility devices are connected. The information on a facility device is information uniquely indicating one facility device. The information on an operating terminal is information uniquely indicating one operating terminal. The information on a facility device and the information on an operating terminal can be, for example, a manufacturing number or information corresponding thereto. The information on a facility device and the information on an operating terminal may be determined and set in the facility device and the operating terminal, respectively, by a worker who installs the facility device and the operating terminal at a time of installation thereof. System configuration information stored in the system configuration information storage unit 13 of the operating terminal 1b is similar to that illustrated in FIG. 3, but regarding the operating terminal 1b, information indicating the "operating terminal 1b" as a connected operating terminal is the first connected-device information, and information indicating the "operating terminal 1a" as a connected operating terminal is the second connected-device information.

The system configuration information is updated by the system configuration management unit 12. Specifically, when the connected-device information collecting unit 121 collects the first connected-device information, the connected-device information collecting unit 121 merges the collected first connected-device information and the system configuration information stored in the system configuration information storage unit 13, thereby updating the system configuration information. In addition, when the connected-device information obtaining unit 122 obtains the second connected-device information, the connected-device information obtaining unit 122 merges the obtained second connected-device information and the system configuration information stored in the system configuration information storage unit 13, thereby updating the system configuration information.

Returning to the description of FIG. 2, the air conditioning control unit 14 includes an air conditioning control command generating unit 141, an air conditioning control command transmitting unit 142, and an air conditioning control command receiving unit 143.

The air conditioning control command generating unit 141 generates an air conditioning control command which is a control command representing the content of an operation received by the operation receiving unit 15.

The air conditioning control command transmitting unit 142 transmits the air conditioning control command generated by the air conditioning control command generating unit 141 to the air conditioner 2a or the operating terminal 1b. The air conditioning control command transmitting unit 142 determines a destination of the air conditioning control command on the basis of the system configuration information stored in the system configuration information storage unit 13. Specifically, the air conditioning control command transmitting unit 142 first specifies, by referring to the system configuration information, the operating terminal 1 to which the air conditioner 2 is connected, the air conditioner 2 being a target of an operation represented by the air conditioning control command generated by the air conditioning control command generating unit 141. Next, the air conditioning control command transmitting unit 142 transmits the air conditioning control command to the air conditioner 2a through the communication line 5a if the specified operating terminal 1 is the operating terminal including the air conditioning control command transmitting unit 142, that is, the operating terminal 1a, and transmits the air conditioning control command to the operating terminal 1b through the communication line 4 if the specified operating terminal 1 is another operating terminal, that is, the operating terminal 1b. The air conditioning control command transmitting unit 142 operates similarly in a case where there is another operating terminal other than the operating terminal 1b. That is, in a case where the operating terminal 1 to which the air conditioner 2 as a target of an operation represented by the air conditioning control command is connected is another operating terminal, the air conditioning control command transmitting unit 142 transmits the air conditioning control command to the another operating terminal through the communication line 4. In addition, when the air conditioning control command receiving unit 143 receives an air conditioning control command transmitted from the another operating terminal, that is, the operating terminal 1b, the air conditioning control command transmitting unit 142 transmits the air conditioning control command received by the air conditioning control command receiving unit 143 to the air conditioner 2 or the another operating terminal. When the facility device control system 100 includes three or more operating terminals, a destination of the air conditioning control command received by the air conditioning control command receiving unit 143 may be the another operating terminal. The air conditioning control command transmitting unit 142 determines a destination of the air conditioning control command received by the air conditioning control command receiving unit 143 on the basis of the system configuration information stored in the system configuration information storage unit 13. The operation of determining the destination of the air conditioning control command received by the air conditioning control command receiving unit 143 is similar to the operation of determining the destination of the air conditioning control command generated by the air conditioning control command generating unit 141. The air conditioning control command transmitting unit 142 is a control command transmitting unit which determines a destination of an air conditioning control command on the basis of the first connected-device information and the second connected-device information, and transmits the air conditioning control command to the determined destination.

The air conditioning control command receiving unit 143 is a control command receiving unit and receives an air conditioning control command transmitted from the another operating terminal, that is, the operating terminal 1b.

The operation receiving unit 15 receives an operation of the air conditioner 2 by the user. The operation received by the operation receiving unit 15 from the user includes a first operation of selecting the air conditioner 2 and a second operation of indicating an operation to be performed by the selected air conditioner 2. The display unit 16 displays an operating state of each of the air conditioners 2a connected to the operating terminal 1a, an operation menu for operating each of the air conditioners 2a or air conditioners connected to the another operating terminal, and the like.

The air conditioner 2a-1 includes an air conditioning communication unit 21 which communicates with the operating terminal 1a, and a device control unit 22 which controls each unit for performing air conditioning included in the air conditioner 2a-1. Examples of a target of control performed by the device control unit 22 includes a refrigerant circuit 23, a louver 24, and a fan 25. In addition, the air conditioner 2a-1 includes a storage means such as a memory (not illustrated), and the storage means stores the above-described information on a facility device, that is, information uniquely indicating the air conditioner 2a-1. When the device control unit 22 receives a request for transmitting facility device information from the operating terminal 1a, the device control unit 22 reads the information on a facility device from the storage means and transmits the information on a facility device to the operating terminal 1a. A component may be separately provided which reads the information on a facility device from the storage means and transmits the information on a facility device to the operating terminal 1a. The operation of the air conditioner 2a-1 is similar to that of a general air conditioner except that the information on a facility device is transmitted to the operating terminal 1a when a request is received from the operating terminal 1a.

Figure 4:
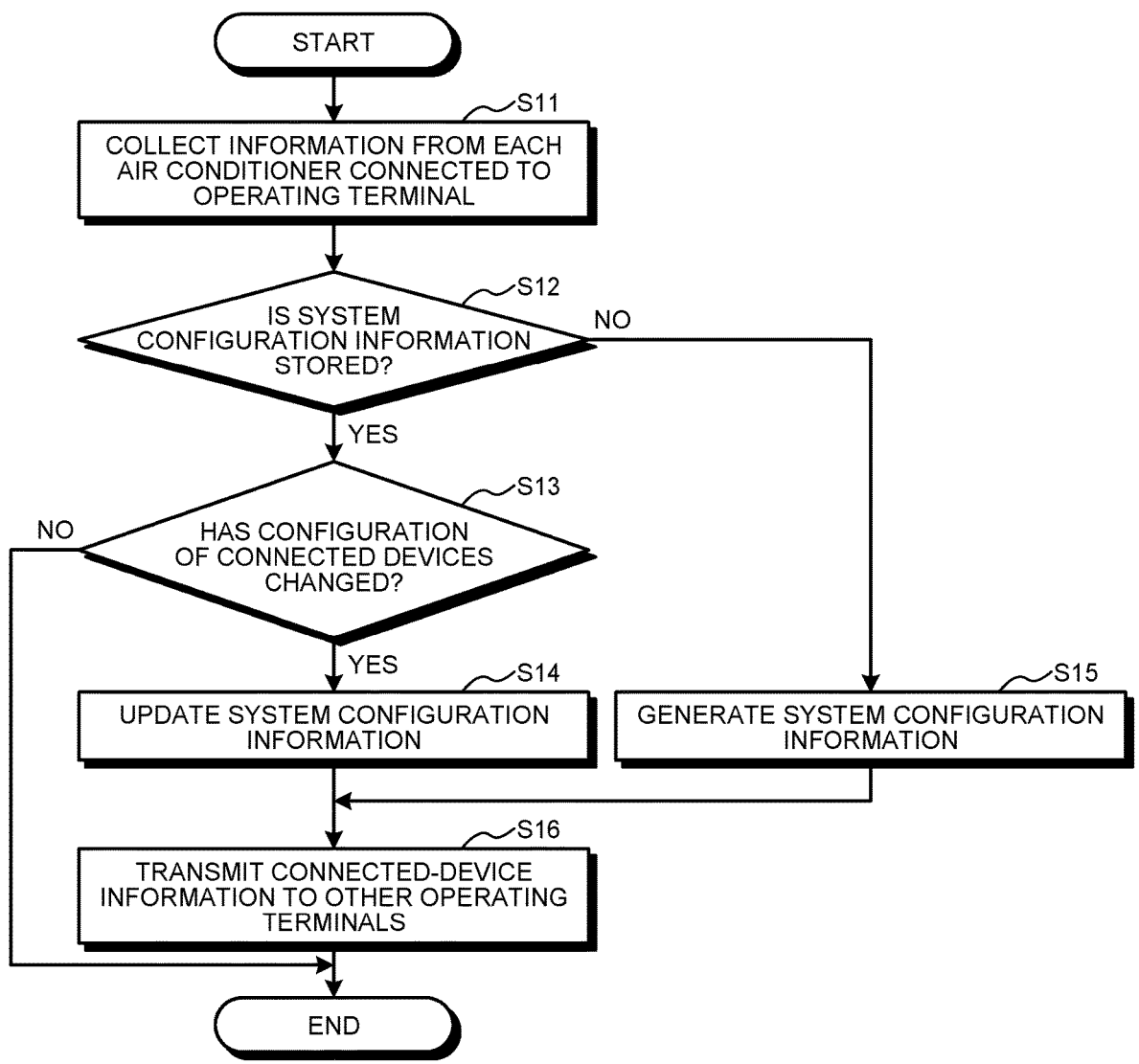
FIG. 4 is a flowchart illustrating an example of an operation in which the operating terminal updates the system configuration information on the basis of information on the air conditioner connected to the operating terminal.
Figure 5:
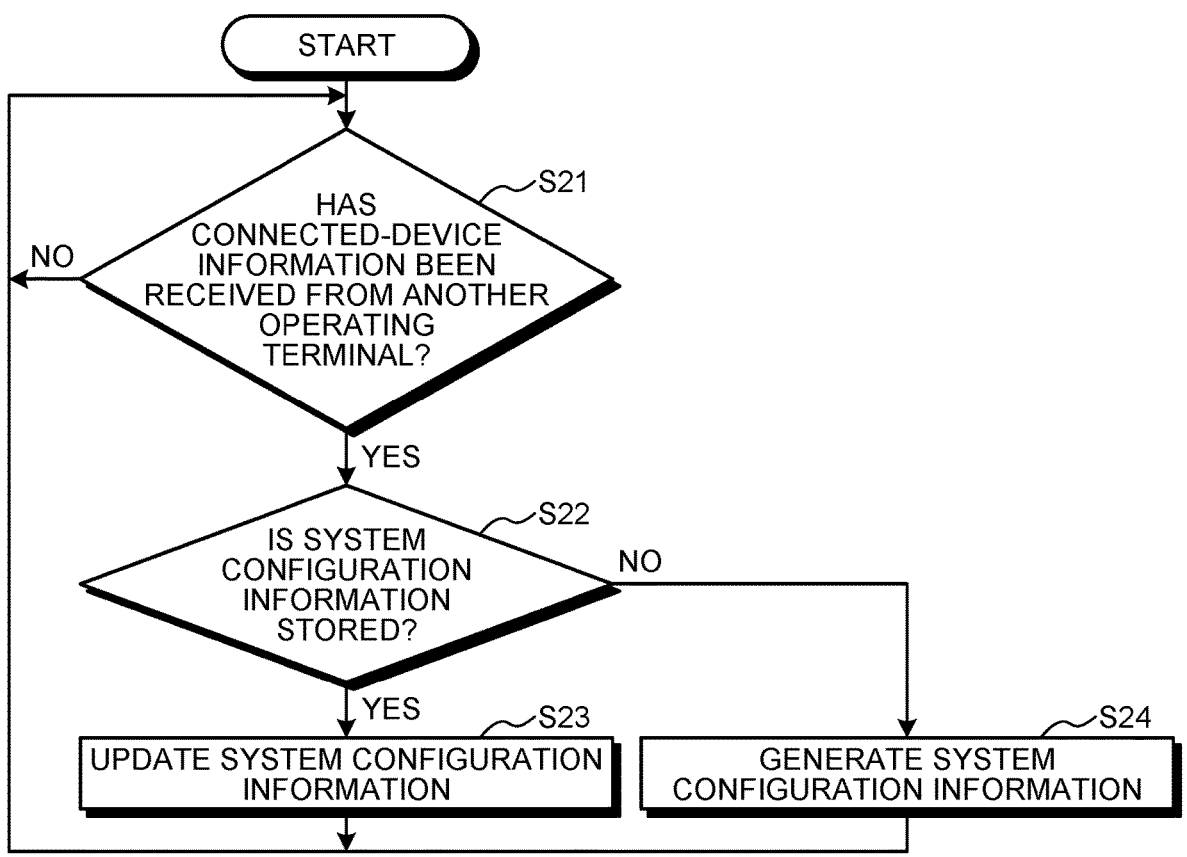
FIG. 5 is a flowchart illustrating an example of an operation in which the operating terminal updates the system configuration information on the basis of information on the air conditioner connected to another operating terminal.
Figures 6, 7:
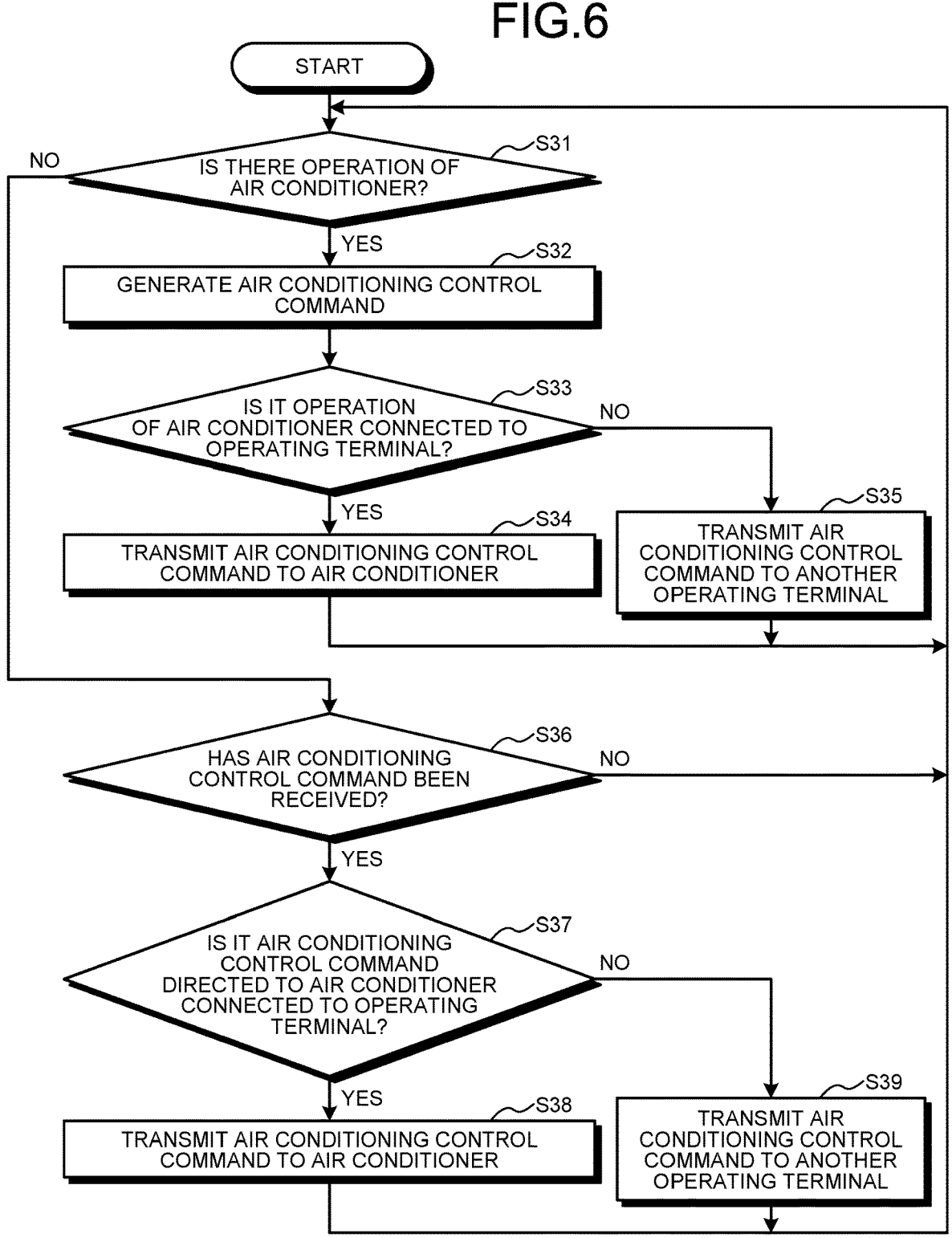
FIG. 6 is a flowchart illustrating an example of an operation in which the operating terminal transmits a control command directed to the air conditioner.
FIG. 7 is a diagram illustrating an example configuration of an air conditioning control command.

Next, operations of the operating terminal 1 will be described with reference to FIGS. 4 to 6. FIG. 4 is a flowchart illustrating an example of an operation in which the operating terminal 1 updates the system configuration information on the basis of the information on the air conditioner 2 connected to the operating terminal 1. FIG. 5 is a flowchart illustrating an example of an operation in which the operating terminal 1 updates the system configuration information on the basis of the information on the air conditioner 2 connected to another operating terminal 1. FIG. 6 is a flowchart illustrating an example of an operation in which the operating terminal 1 transmits a control command directed to the air conditioner 2.

The operating terminal 1 updates the system configuration information stored in the system configuration information storage unit 13 by repeatedly executing each of steps illustrated in FIG. 4 at a predetermined timing. The operating terminal 1 executes step S11 and each of steps subsequent thereto illustrated in FIG. 4 each time a predetermined time elapses, for example. The operating terminal 1 may execute step S11 and each of the steps subsequent thereto illustrated in FIG. 4 when receiving a predetermined operation.

When a predetermined timing comes, the operating terminal 1 collects, from each air conditioner 2 connected to the operating terminal 1, information uniquely indicating the air conditioner 2 (step S11). Specifically, the connected-device information collecting unit 121 generates a signal directed to the air conditioner 2 and indicating a request for transmitting the facility device information, transmits the signal to the air conditioner 2 via the air conditioning communication unit 112 and the communication line 5, and waits for a response from the air conditioner 2 for a certain period of time. The connected-device information collecting unit 121 broadcasts the signal indicating the request for transmitting the facility device information to the air conditioners 2. When each air conditioner 2 receives the signal indicating the request for transmitting the facility device information from the operating terminal 1, the air conditioner 2 transmits the information on a facility device which is the information uniquely indicating the air conditioner 2 to the operating terminal 1.

If, after waiting for the response from the air conditioner 2 for a certain period of time, the system configuration information is stored (step S12: Yes), the operating terminal 1 moves to step S13, and if the system configuration information is not stored (step S12: No), the operating terminal 1 moves to step S15. Specifically, the connected-device information collecting unit 121 checks whether the system configuration information is stored in the system configuration information storage unit 13 (step S12), and if the system configuration information is not stored (step S12: No), the connected-device information collecting unit 121 generates the system configuration information (step S15), and transfers the generated system configuration information to the system configuration information storage unit 13. In such a case, the connected-device information collecting unit 121 generates the system configuration information on the basis of the information collected in step S11. That is, the connected-device information collecting unit 121 generates the system configuration information by associating the information collected in step S11 with the information indicating the operating terminal 1.

On the other hand, if the system configuration information is stored in the system configuration information storage unit 13 (step S12: Yes), the connected-device information collecting unit 121 checks whether the configuration of the connected devices, that is, a connection relationship between the operating terminal 1 and the air conditioners 2 has changed (step S13). The connected-device information collecting unit 121 determines whether the connection relationship has changed by comparing each piece of information collected in step S11 with the system configuration information. For example, it is assumed that the information collected in step S11 is information on air conditioner A, information on air conditioner B, and information on air conditioner C. In such a case, if the system configuration information indicates that air conditioners connected to the operating terminal 1 are three air conditioners which are air conditioners A, B, and C, the connected-device information collecting unit 121 determines that the connection relationship has not changed. In addition, if the system configuration information indicates in the above case that the air conditioners connected to the operating terminal 1 are two air conditioners which are air conditioners A and B, the connected-device information collecting unit 121 determines that the connection relationship has changed. Furthermore, if the system configuration information indicates in the above case that air conditioners connected to the operating terminal 1 are three air conditioners which are air conditioners A, B, and D, the connected-device information collecting unit 121 determines that the connection relationship has changed.

If the connected-device information collecting unit 121 determines that the connection relationship has not changed (step S13: No), the operating terminal 1 ends the process. On the other hand, if the connection relationship has changed (step S13: Yes), the connected-device information collecting unit 121 updates the system configuration information stored in the system configuration information storage unit 13 (step S14). Specifically, the connected-device information collecting unit 121 merges the first connected-device information which is information on each air conditioner 2 collected in step S11, and the current system configuration information stored in the system configuration information storage unit 13, thereby updating the system configuration information.

In a case where step S14 has been executed to generate the system configuration information and in a case where step S15 has been executed to generate the system configuration information, the operating terminal 1 transmits the connected-device information to other operating terminals 1 in the vicinity thereof (step S16), and then ends the process. The process in step S16 is performed by the connected-device information transmitting unit 123. In step S16, the connected-device information transmitting unit 123 transmits the first connected-device information, which is the information on each air conditioner 2 collected by the connected-device information collecting unit 121 in step S11, to all other operating terminals. At that time, the connected-device information transmitting unit 123 may individually transmit or may broadcast the first connected-device information to other operating terminals 1. In a case where the connected-device information transmitting unit 123 transmitted the first connected-device information to other operating terminals 1 in the past, specifically, in a case where step S16 is executed subsequent to step S14, the connected-device information transmitting unit 123 may transmit, to other operating terminals 1, only the information on the air conditioner 2 of which connection relationship has changed, that is, information on the air conditioner 2 newly connected and information on the air conditioner 2 which is no longer connected. In such a case, the amount of information to be transmitted can be reduced. In a case where step S16 is executed subsequent to step S15, the information on the air conditioner 2 connected to the operating terminal 1 is collected for the first time, and the connected-device information transmitting unit 123 transmits the collected information to another operating terminal 1. Therefore, it can be said that also the information transmitted in the case where step S16 is executed subsequent to step S15 is the information on the air conditioner 2 of which connection relationship has changed.

In addition, the operating terminal 1 repeatedly executes each of the steps illustrated in FIG. 5 to obtain connected-device information from another operating terminal 1, and updates the stored system configuration information on the basis of the obtained connected-device information. Each of the steps illustrated in FIG. 5 is a process executed by the connected-device information obtaining unit 122 of the operating terminal 1.

That is, the connected-device information obtaining unit 122 checks whether the connected-device information has been received from another operating terminal 1 (step S21), and if the connected-device information has not been received (step S21: No), the connected-device information obtaining unit 122 repeats step S21. If the connected-device information has been received from the another operating terminal 1 (step S21: Yes), the connected-device information obtaining unit 122 checks whether the system configuration information is stored in the system configuration information storage unit 13 (step S22), and if the system configuration information is not stored (step S22: No), the connected-device information obtaining unit 122 generates the system configuration information (step S24), and transfers the generated system configuration information to the system configuration information storage unit 13. In such a case, the connected-device information obtaining unit 122 transfers, as the system configuration information, the second connected-device information which is the connected-device information received from the another operating terminal 1 to the system configuration information storage unit 13.

On the other hand, if the system configuration information is stored in the system configuration information storage unit 13 (step S22: Yes), the connected-device information obtaining unit 122 updates the system configuration information stored in the system configuration information storage unit 13 (Step S23). Specifically, the connected-device information obtaining unit 122 merges the second connected-device information which is the connected-device information received, that is, obtained from the another operating terminal 1, and the current system configuration information stored in the system configuration information storage unit 13, thereby updating the system configuration information.

In addition, the operating terminal 1 checks whether the operation of the air conditioner has been performed by repeatedly executing each of the steps illustrated in FIG. 6, and generates and transmits an air conditioning control command.

The operating terminal 1 checks whether there is an operation of the air conditioner 2, that is, whether the operation receiving unit 15 has received an operation of the air conditioner 2 (step S31). If the operation receiving unit 15 has received the operation of the air conditioner 2 (step S31: Yes), the operating terminal 1 generates an air conditioning control command indicating the content of the operation received by the operation receiving unit 15 (step S32). In step S32, the air conditioning control command generating unit 141 generates the air conditioning control command. FIG. 7 is a diagram illustrating an example configuration of the air conditioning control command generated by the air conditioning control command generating unit 141. As illustrated in FIG. 7, the air conditioning control command includes at least information on a facility device and information on a command content. The information on a facility device is information indicating a facility device to which the command is directed, and is information similar to the information on a facility device included in the system configuration information illustrated in FIG. 3. The information on a command content indicates the content of the operation received by the operation receiving unit 15. For example, in a case where the operation receiving unit 15 receives an operation of starting the operation of the air conditioner 2b-1 illustrated in FIG. 1, the air conditioning control command generating unit 141 generates an air conditioning control command including the information on a facility device indicating the air conditioner 2b-1, and information on a command content indicating the start of the operation. The operation received by the operation receiving unit 15 is not limited to an operation to be performed on one air conditioner. The operation receiving unit 15 can receive an operation to be performed on all the air conditioners 2 of the facility device control system 100, and can receive an operation to be performed on some of the air conditioners 2 of the facility device control system 100. For example, the operation receiving unit 15 can receive an operation of stopping the operation of all the air conditioners 2 of the facility device control system 100, an operation of changing set temperatures of some of the air conditioners 2, and the like.

Subsequent to step S32, the operating terminal 1 checks whether the operation detected in step S31 is an operation of the air conditioner 2 connected to the operating terminal 1, that is, whether the information on a facility device included in the air conditioning control command generated in step S32 indicates the air conditioner 2 connected to the operating terminal 1 (step S33). Step S33 is performed by the air conditioning control command transmitting unit 142. The air conditioning control command transmitting unit 142 checks the system configuration information stored in the system configuration information storage unit 13 and determines whether the operation is an operation of the air conditioner 2 connected to the operating terminal 1. If the operation is an operation of the air conditioner 2 connected to the operating terminal 1 (step S33: Yes), the air conditioning control command transmitting unit 142 transmits the air conditioning control command to the air conditioner 2 (step S34). If the operation is not an operation of the air conditioner 2 connected to the operating terminal 1 (step S33: No), the air conditioning control command transmitting unit 142 transmits the air conditioning control command to another operating terminal 1 (step S35).

On the other hand, if there is no operation of the air conditioner 2 (step S31: No), the operating terminal 1 checks whether an air conditioning control command has been received from another operating terminal 1 (step S36). Step S36 is performed by the air conditioning control command receiving unit 143. If the air conditioning control command receiving unit 143 has not received the air conditioning control command (step S36: No), the operating terminal 1 returns to step S31. If the air conditioning control command receiving unit 143 has received the air conditioning control command (step S36: Yes), the air conditioning control command receiving unit 143 transfers the received air conditioning control command to the air conditioning control command transmitting unit 142, and the air conditioning control command transmitting unit 142 checks whether the received air conditioning control command is an air conditioning control command directed to the air conditioner 2 connected to the operating terminal 1 (step S37). The air conditioning control command transmitting unit 142 checks the system configuration information stored in the system configuration information storage unit 13 and determines whether the air conditioning control command is an air conditioning control command directed to the air conditioner 2 connected to the operating terminal 1. If the air conditioning control command is an air conditioning control command directed to the air-conditioner 2 connected to the operating terminal 1 (step S37: Yes), the air conditioning control command transmitting unit 142 transmits the air conditioning control command to the air conditioner 2 (step S38). If the air conditioning control command is not an air conditioning control command directed to the air conditioner 2 connected to the operating terminal 1 (step S37: No), the air conditioning control command transmitting unit 142 transmits the air conditioning control command to another operating terminal 1 (step S39).

Figure 8:
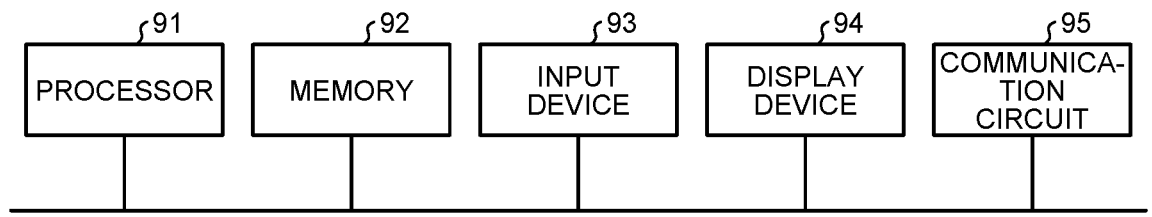
FIG. 8 is a diagram illustrating an example hardware configuration of the operating terminal according to the embodiment.

Next, a hardware configuration of the operating terminal 1 according to the present embodiment will be described. FIG. 8 is a diagram illustrating an example hardware configuration of the operating terminal 1 according to the embodiment. The operating terminal 1 includes hardware such as a processor 91, a memory 92, an input device 93, a display device 94, and a communication circuit 95.

The processor 91 is a central processing unit (CPU, also referred to as a central processing device, a processing device, an arithmetic device, a microprocessor, a microcomputer, a processor, and a digital signal processor (DSP)) or the like. The memory 92 corresponds to a nonvolatile or volatile semiconductor memory such as a random access memory (RAM), a read only memory (ROM), or a flash memory. The input device 93 is a keypad, buttons, or the like. The display device 94 is a liquid crystal monitor, a display, or the like. The input device 93 and the display device 94 may be a touch panel having a configuration in which the input device 93 and the display device 94 are integrated. The communication circuit 95 is a processing circuit for transmitting and receiving signals to and from other operating terminals 1 and the air conditioners 2.

Among the components of the operating terminal 1 illustrated in FIG. 2, the inter-terminal communication unit 111 and the air conditioning communication unit 112 of the communication unit 11 are realized by the communication circuit 95. The connected-device information collecting unit 121, the connected-device information obtaining unit 122, and the connected-device information transmitting unit 123 of the system configuration management unit 12, as well as the air conditioning control command generating unit 141, the air conditioning control command transmitting unit 142, and the air conditioning control command receiving unit 143 of the air conditioning control unit 14 are realized by the processor 91 and the memory 92. Particularly, the above-described respective units of the system configuration management unit 12 and the above-described respective units of the air conditioning control unit 14 are realized by storing, in the memory 92, programs for operating as the above-described respective units of the system configuration management unit 12 and the above-described respective units of the air conditioning control unit 14, and by the processor 91 reading the programs from the memory 92 and executing the programs. In addition, the system configuration information storage unit 13 is realized by the memory 92. Furthermore, the operation receiving unit 15 is realized by the input device 93. The display unit 16 is realized by the display device 94.

As described above, the operating terminal 1 according to the present embodiment collects information on the air conditioners 2 connected to the operating terminal 1 and transmits the information to another operating terminal 1, and obtains, from the another operating terminal 1, the information on the air conditioners 2 connected to the another operating terminal 1 to generate and store the system configuration information including the first connected-device information which is the information on the air conditioners 2 connected to the operating terminal 1 and the second connected-device information which is the information on the air conditioners 2 connected to the another operating terminal 1. In addition, when the operating terminal 1 receives an operation to be performed on the air conditioner 2, the operating terminal 1 generates an air conditioning control command representing the content of the received operation, determines a destination of the air conditioning control command on the basis of the system configuration information, and transmits the air conditioning control command. Specifically, in a case where the received operation is an operation to be performed on the air conditioner 2 connected to the operating terminal 1, the operating terminal 1 transmits the air conditioning control command to the air conditioner 2 connected to the operating terminal 1, and in a case where the received operation is an operation to be performed on the air conditioner 2 connected to the another operating terminal 1, the operating terminal 1 transmits the air conditioning control command to the another operating terminal 1. In addition, in a case where the operating terminal 1 receives, from the another operating terminal 1, an air conditioning control command representing the content of an operation to be performed on the air conditioner 2 connected to the operating terminal 1, the operating terminal 1 transmits the received air conditioning control command to the air conditioner 2 connected to the operating terminal 1. As described above, since the operating terminal 1 according to the present embodiment stores the information on the air conditioners 2 connected to the another operating terminals 1, the operating terminal 1 can receive an operation to be performed on the air conditioner 2 connected to the another operating terminal 1 and can transmit an air conditioning control command to the air conditioner 2 to be operated via the another operating terminal 1, which makes it possible to increase the number of operable air conditioners 2.

In the present embodiment, each of the multiple operating terminals 1 transmits and receives necessary information to and from another operating terminal to update the system configuration information. However, some of the multiple operating terminals 1 may collect necessary information to update the system configuration information, and may transmit latest system configuration information to another operating terminal 1 each time the system configuration information is updated.

In addition, the operating terminal 1 may obtain, from another operating terminal 1, information on a state in which the air conditioners 2 connected to the another operating terminal 1 are operated, and may display, on the display unit 16, the state in which the air conditioners 2 connected to the another operating terminal 1 are operated. In such a case, for example, the connected-device information collecting unit 121 periodically inquires about the operating state of each air conditioner 2 connected to the operating terminal 1 to know the operating state of each air conditioner 2. In addition, the connected-device information transmitting unit 123 transmits, to the another operating terminal 1, information on the operating state of each air conditioner 2 connected to the operating terminal 1. The connected-device information obtaining unit 122 obtains the information on the operating state of each air conditioner connected to the another operating terminal 1, and displays the operating state on the display unit 16.

The configurations described in the embodiment above are merely examples of the content of the present invention and can be combined with other known technology and part thereof can be omitted or modified without departing from the gist of the present invention.

The invention claimed is:

1. An operating terminal used for operating facility devices including a first facility device connected directly to the operating terminal and a second facility device connected directly to another operating terminal, the operating terminal and the another operating terminal being communicably connected through wired or wireless communication, the operating terminal comprising:

a processor coupled to a memory and configured to:

transmit first connected-device information to the another operating terminal, the first connected-device information being information on the first facility device connected directly to the operating terminal, the operating terminal and the another operating terminal being communicably connected through wired or wireless communication;

obtain second connected-device information from the another operating terminal, the second connected-device information being information on the second facility device connected directly to the another operating terminal;

execute communication repeatedly at a predetermined timing to obtain, from the first facility device, identification information regarding the first facility device, and generate the first connected-device information on a basis of identification information obtained by the communication;

receive an operation for being performed on the first facility device connected to the operating terminal and the second facility device connected to the another operating terminal; and determine, from the first connected-device information and the second connected-device information, a destination of a control command and transmit the control command to the destination, the control command representing content of the operation received by the processor, wherein the processor is further configured to determine whether latest connected-device information that is the first connected-device information most recently generated by the processor is different from the first connected-device information generated last time by the processor, and responsive to the last connected-device information being determined to be different from the first connected-device information generated last time, transmit the latest connected-device information to the another operating terminal.

2. The operating terminal according to claim 1, wherein the processor receives a first operation of selecting one facility device of the facility devices and a second operation of indicating an operation for being performed by the selected one facility device selected in the first operation.

3. The operating terminal according to claim 2, wherein the processor is further configured to:
receive the control command transmitted from the another operating terminal, wherein
the processor determines a destination of the control command which is received on a basis of the first connected-device information and the second connected-device information, and transmits the control command which is received to the determined destination.

4. The operating terminal according to claim 2, wherein the processor obtains information on an operating state of the second facility device connected to the another operating terminal, and displays the operating state of the second facility device on a display unit.

5. The operating terminal according to claim 3, wherein the processor obtains information on an operating state of the second facility device connected to the another operating terminal, and displays the operating state of the second facility device on a display unit.

6. The operating terminal according to claim 1, wherein the processor is further configured to:
receive the control command transmitted from the another operating terminal, wherein
the processor determines a destination of the control command which is received on a basis of the first connected-device information and the second connected-device information, and transmits the control command which is received to the determined destination.

7. The operating terminal according to claim 6, wherein the processor obtains information on an operating state of the second facility device connected to the another operating terminal, and displays the operating state of the second facility device on a display unit.

8. The operating terminal according to claim 1, wherein the processor obtains information on an operating state of the second facility device connected to the another operating terminal, and displays the operating state of the second facility device on a display unit.

9. A facility device control system comprising:
a plurality of operating terminals, each of the operating terminals being the operating terminal according to claim 1; and
a plurality of facility devices connected to any one of the plurality of operating terminals.

* * * * *